United States Patent
Ma (10) Patent No.: US 6,530,589 B1
(45) Date of Patent: Mar. 11, 2003

(54) STRUCTURE OF A BICYCLE FOR CHILDREN

(75) Inventor: Pei-Chuan Ma, Taipei (TW)

(73) Assignee: New Art City Industrial Co., Ltd., Taipei (TW)

( * ) Notice: Subject to any disclaimer, the term of this patent is extended or adjusted under 35 U.S.C. 154(b) by 0 days.

(21) Appl. No.: 10/102,906

(22) Filed: Mar. 22, 2002

(51) Int. Cl.[7] .................. B62K 3/02; B62K 15/00; B62K 21/16; B62H 1/12
(52) U.S. Cl. .................. 280/278; 74/551.3; 280/270; 280/287; 280/293; 280/301; 280/47.11
(58) Field of Search .................. 280/278, 287, 280/301, 293, 295, 297, 303, 263, 270, 271, 272, 273, 276, 47.11; 74/551.3, 551.4

(56) References Cited

U.S. PATENT DOCUMENTS

| | | | | |
|---|---|---|---|---|
| 390,916 A | * | 10/1888 | Stevens | |
| 669,201 A | * | 3/1901 | Hehr | |
| 3,863,521 A | * | 2/1975 | Gatsos et al. | 74/551.4 |
| 4,070,032 A | * | 1/1978 | Cunningham | 280/231 |
| 5,351,979 A | * | 10/1994 | Langen | 280/254 |
| 6,062,581 A | * | 5/2000 | Stites | 280/263 |
| 6,120,048 A | * | 9/2000 | Li | 280/270 |
| 6,152,473 A | * | 11/2000 | Shih | 280/278 |
| 6,286,849 B1 | * | 9/2001 | Slattery | 280/301 |

FOREIGN PATENT DOCUMENTS

DE        3506026      * 8/1986

* cited by examiner

*Primary Examiner*—Anne Marie Boehler
(74) *Attorney, Agent, or Firm*—Leong C. Lei (57) ABSTRACT

An improved structure of a bicycle for children is disclosed. The bicycle comprises a front and a rear frame and a flexural mechanism is used to connect the front and the rear frame such that the tricycle can be folded. The upper section of the front frame is extended with a foldable handle and the front frame is provided with a rotating shaft. The rotating shaft is connected to a control shaft disposed at the rear frame by means of a cable such that the tricycle can be control the front wheel to move left or right by controlling the left and right movement of the control shaft.

1 Claim, 11 Drawing Sheets

STRUCTURE OF A BICYCLE FOR CHILDREN

BACKGROUND OF THE INVENTION (a) Field of the Invention

The present invention relates to structure of a bicycle for children, and in particular, a bicycle which can be folded and the pedaling direction can be manually controlled from the rear of the bicycle.

(b) Description of the Prior Art

Conventional bicycles for children having a front and rear wheel, pedals and/or auxiliary wheels do not provide structure allowing the bicycle to be folded. Therefore, such bicycles are not convenient with respect to transporting or storage. In addition, the parent of the child cannot assist the child when the child is pedaling the bicycle. Accordingly, it is an object of the present invention to provide an improved structure of a bicycle for children which can be folded and facilitate storage and shipping.

SUMMARY OF THE INVENTION

Accordingly, it is an object of the present invention to provide an improved structure of a bicycle for children, wherein a flexural mechanism is provided between the front and the rear frame allowing the structure of the bicycle to be folded for storage and transporting.

Yet another object of the present invention is to provide an improved structure of a bicycle for children, wherein a control shaft is provided to control the direction of the bicycle.

A further object of the present invention is to provide an improved structure of a bicycle for children, wherein a grip is pivotally mounted to a handle, and in application, a mounting ring is employed to fix the grip and when not in use, the grip can be pivotally folded so as to minimize the size of the bicycle for storage.

Still another object of the present invention is to provide an improved structure of a bicycle for children, wherein a rotating shaft is provided to the front frame, and a control shaft is provided to a support frame, and two cables are used to connect the rotating shaft and the control shaft, thereby the control shaft controls the direction of the bicycle.

Still a further object of the present invention is to provide an improved structure of a bicycle for children, wherein the center shaft position of the rear wheels is provided with two auxiliary wheels, and when the two auxiliary wheels are extended and touch the ground, they provide an auxiliary function to the bicycle.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PRESENT INVENTION

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
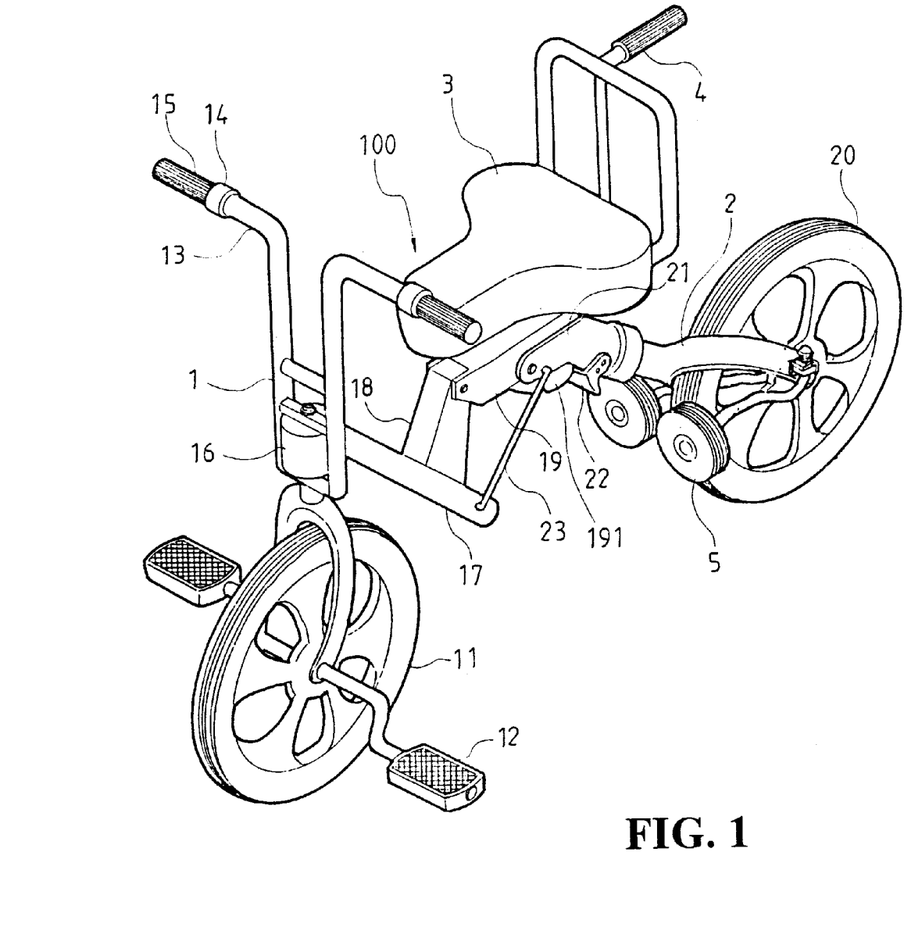
FIG. 1 is a perspective view of an improved structure of a bicycle for children in accordance with the present invention.

Referring to FIG. 1, the structure of the bicycle of the present invention comprises a front frame 1 having mounted with a front wheel 11 and pedals 12 at the bottom section of the frame 1, a pair of handles 13, a rotating shaft, a support frame 19, a rear fame and a pair of auxiliary wheels. The two handles 13 are extended from the upper section of the frame 1 and a pair of grips 15 are mounted to the handles 13 by means of a mounting ring 14. The center position of the front frame 1 is provided with a cylindrical seat 16 which is connected to a sloping shaft 17. On the sloping shaft 17, a securing shaft 18 is provided for connection with the support frame 19 such that the support frame 19 is connected to the rear frame 2. The upper section of the support frame 19 is provided with a seat pad 3 and the rear of the support frame 19 is mounted with a control shaft 4.

The lower section of the rear frame 2 is provided with a rear wheel 20 and the center axis of the rear wheel is connected to two auxiliary wheels. The upper section of the rear frame 2 is provided with a connection seat 21 and a control button 22 such that the connection seat 21 is connected to the sloping shaft 17 by a linking shaft 23.

In view of the above structure, a bicycle structure for children is obtained and the control shaft 4 is operated by the child to control the direction of the bicycle. When the bicycle is not in use, the front, rear frame 1,2 can be folded so as to facilitating transporting or storage.

Figure 2:
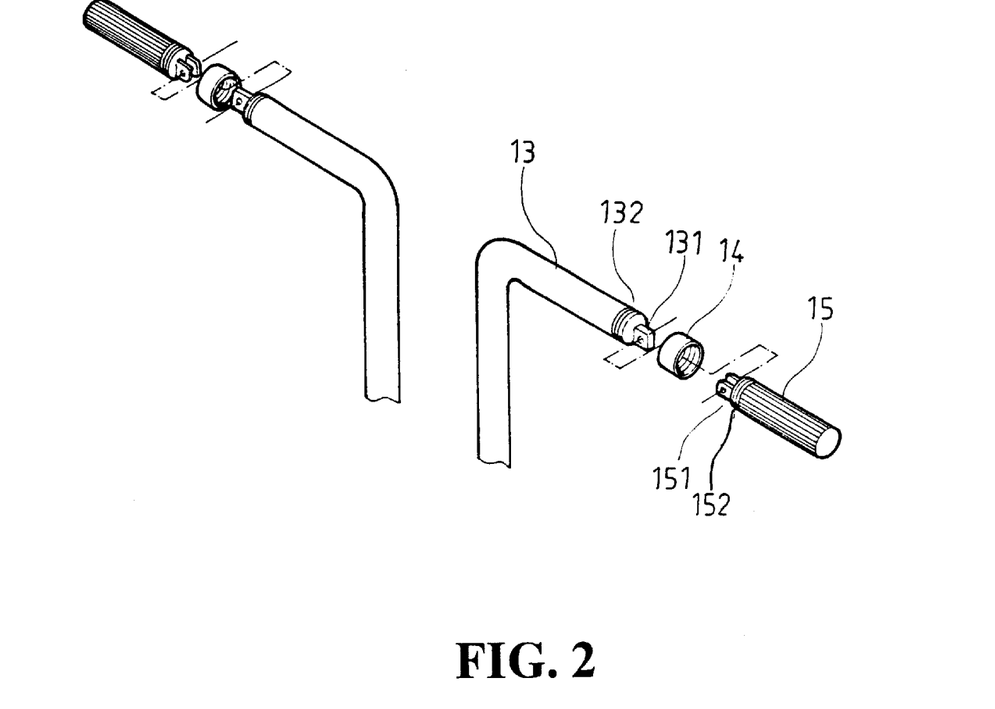
FIG. 2 is an exploded perspective view showing the folding of handles of the improved structure of a bicycle for children in accordance with the present invention.
Figure 3:
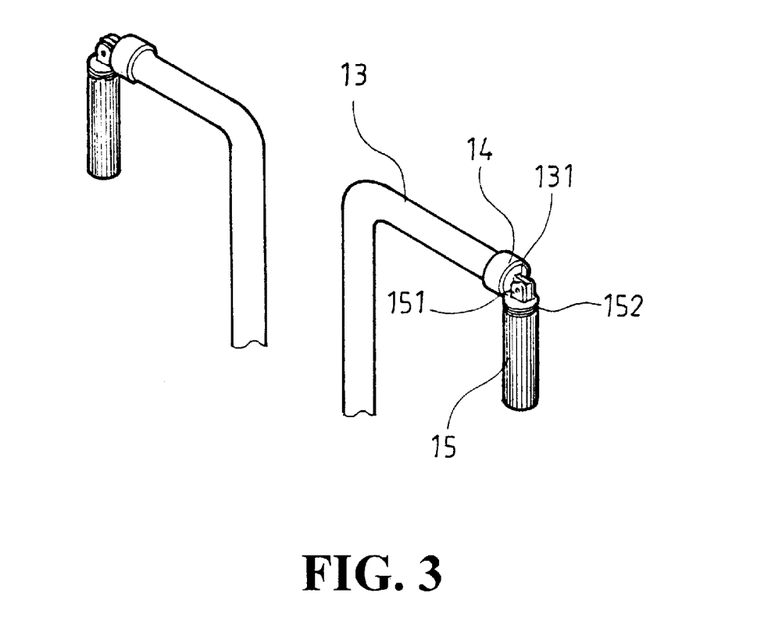
FIG. 3 schematically shows the folding of the handle of the bicycle in accordance with the present invention.

Referring to FIGS. 2 and 3, the end face of the handle 13 is provided with a protruded securing plate 131 and the grip 15 is positioned correspond to the lug 151 such that the handle 13 and the grip 15 are secured by means of the securing plate 131 and the lug 151, providing a folding mechanism, wherein the handle 13 and the end edge of the grip 15 are provided with threads 132, 152 so that when the handle 13 and the grip 15 are in horizontal, the mounting ring 14 is used to lock the handle 13 and the grip 15, controlling the direction of cycling.

Figure 4:
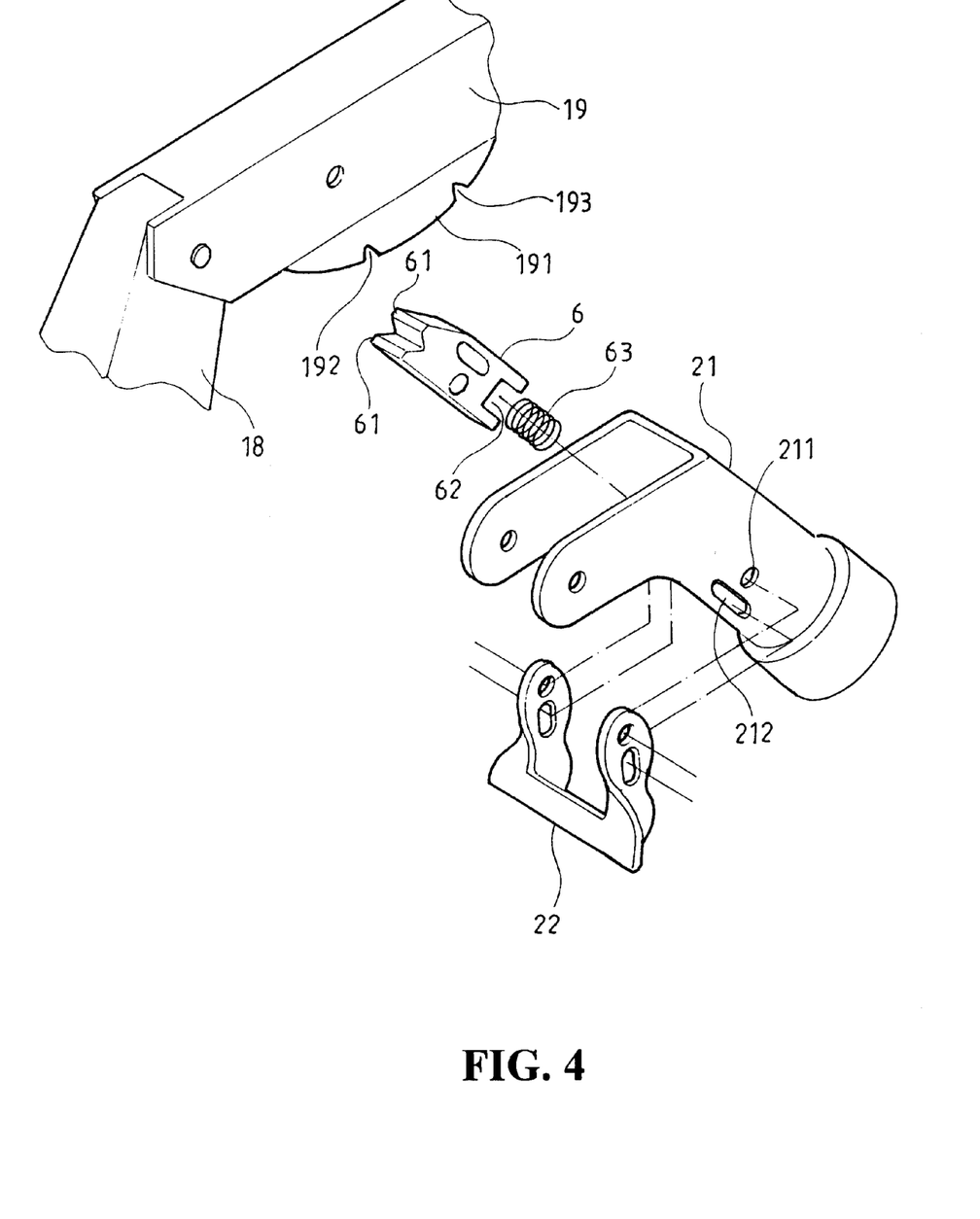
FIG. 4 is a perspective view showing the front, rear frame flexural structure in accordance with the present invention.

Referring to FIG. 4, a semicircular plate body 191 is located at the bottom edge of the support frame 19 and notches 192, 193 are provided to the plate body 191 and the connection seat 21 is provided with a securing hole 211 and a long hole 212, such that after the engaging button 6, having a front end provided with a protrusion 61 and the rear end provided with a mounting recess 62, is mounted with a spring 63, being located within the connection seat 21. Next the U-shaped control button 22 is mounted to the connection seat 21 with the lug thereof such that the engaging button 6 and the control button 22 are respectively mounted at the interior and exterior of the connection seat 2, thereby, by means of the control button 22 to trigger the engaging button 6, the notches 192, 193 engaged at the semicircular plate body 191 allow the front and rear frame 1, 2 to fold.

Figure 5:
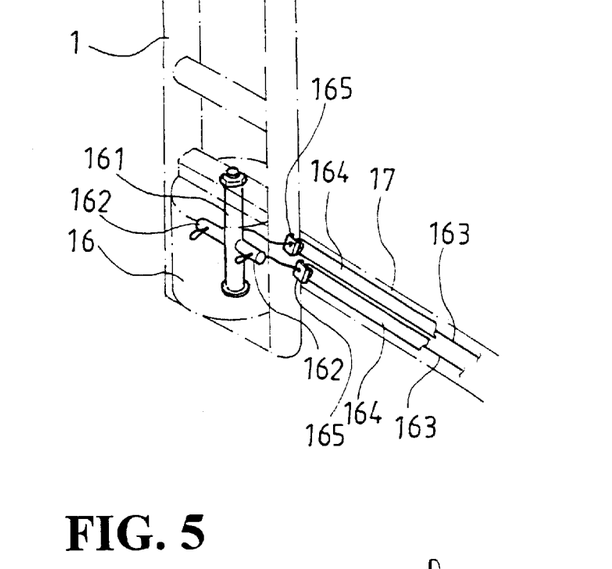
FIG. 5 is a schematic view showing the rotating shaft in accordance with the present invention.
Figure 6:
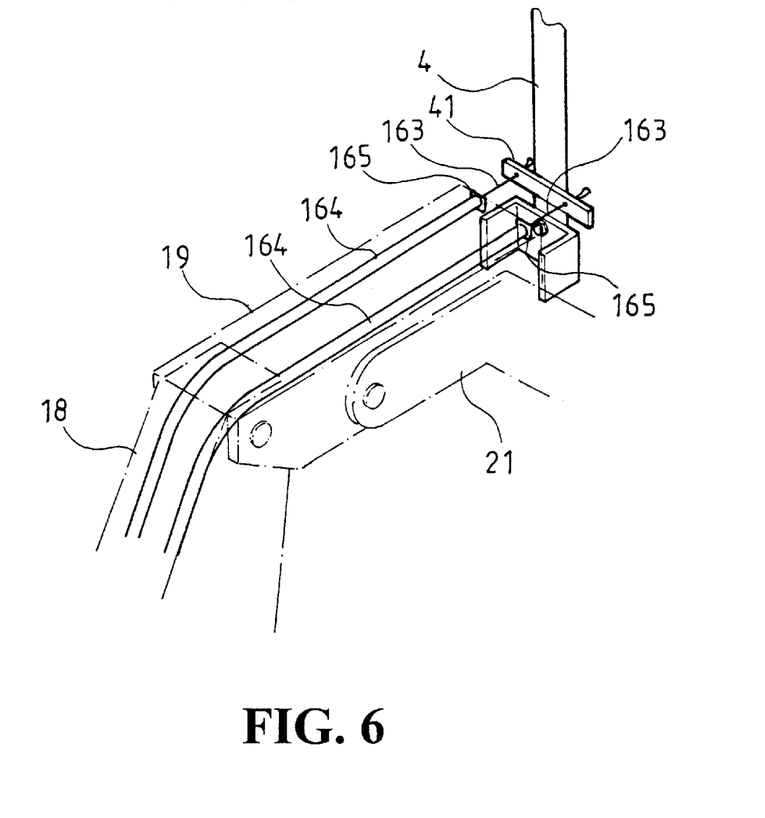
FIG. 6 is a schematic view showing the structure of the control shaft in accordance with the present invention.
Figure 7:
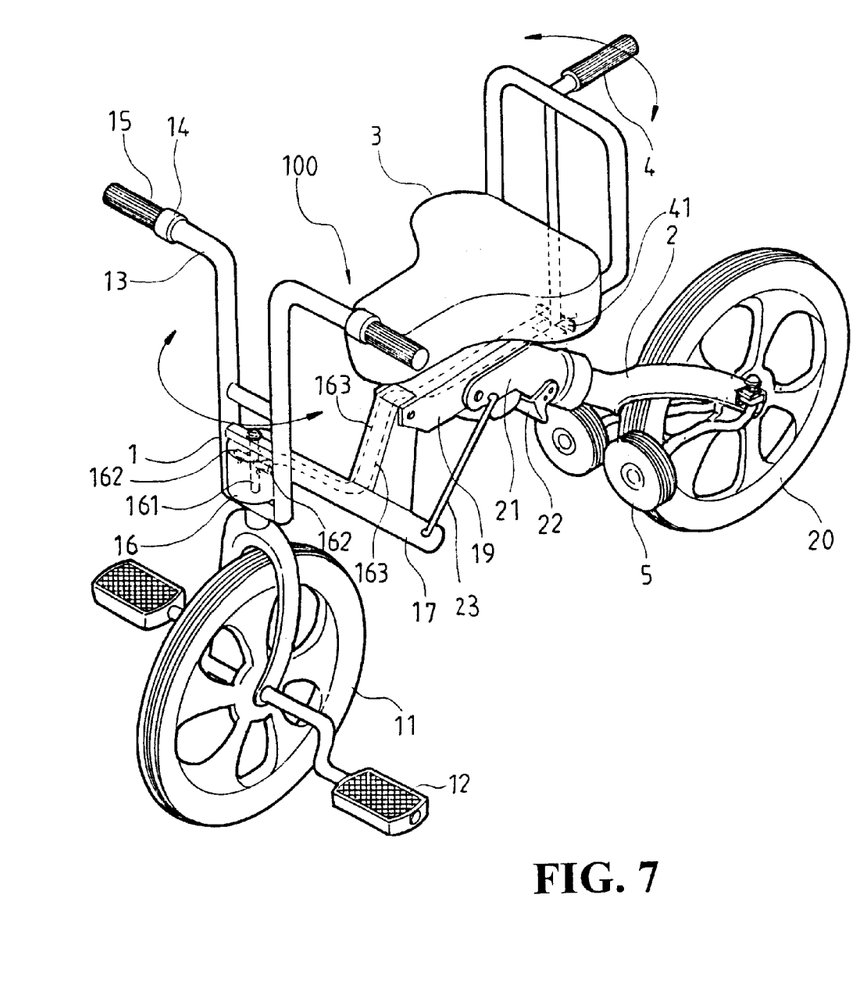
FIG. 7 is a schematic view showing the connection of the rotating shaft and the control shaft in accordance with the present invention.
Figure 8:
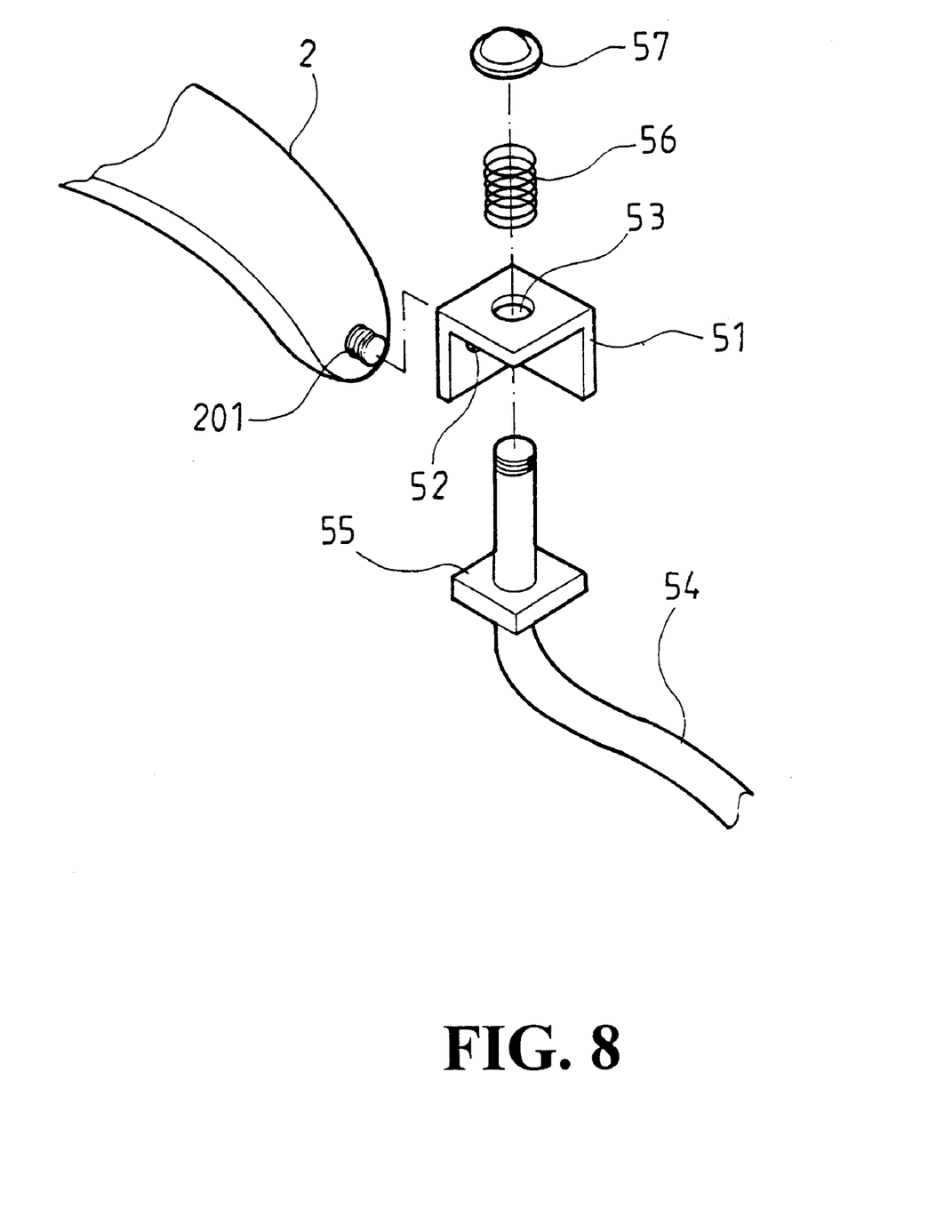
FIG. 8 shows a perspective exploded view of the flexural structure of the auxiliary wheel in accordance with the present invention.
Figure 9:
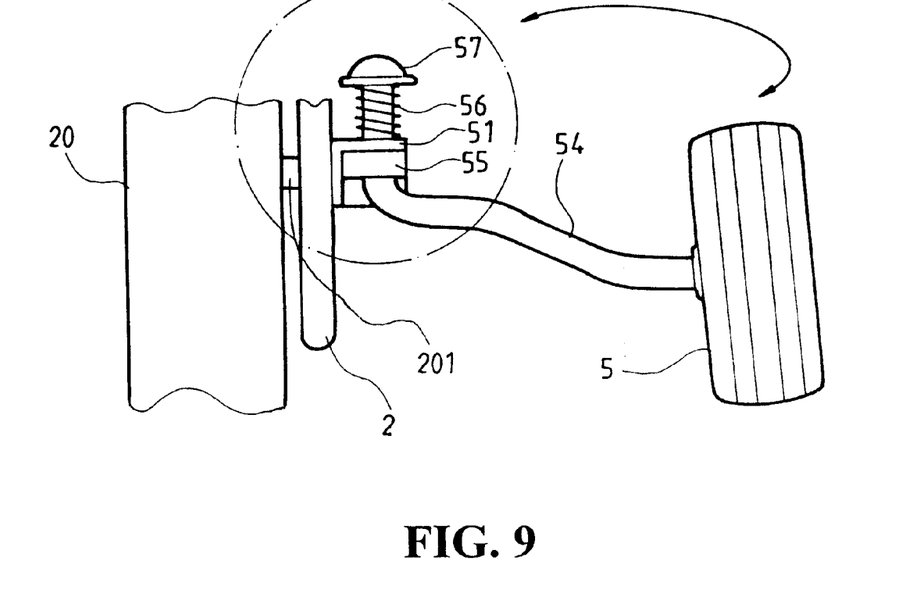
FIG. 9 is a schematic view showing the outward extension of the auxiliary wheel in accordance with the present invention.
Figure 10:
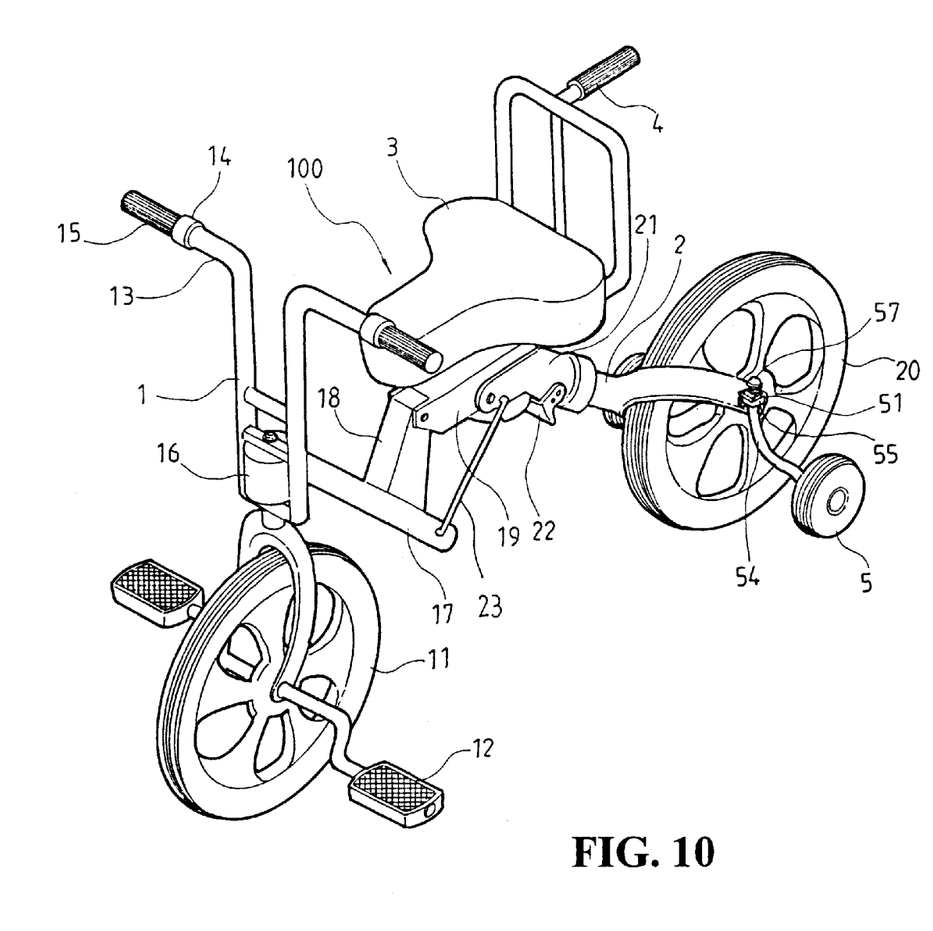
FIG. 10 illustrates the application of the extended auxiliary wheel in accordance with the present invention.
Figure 11:
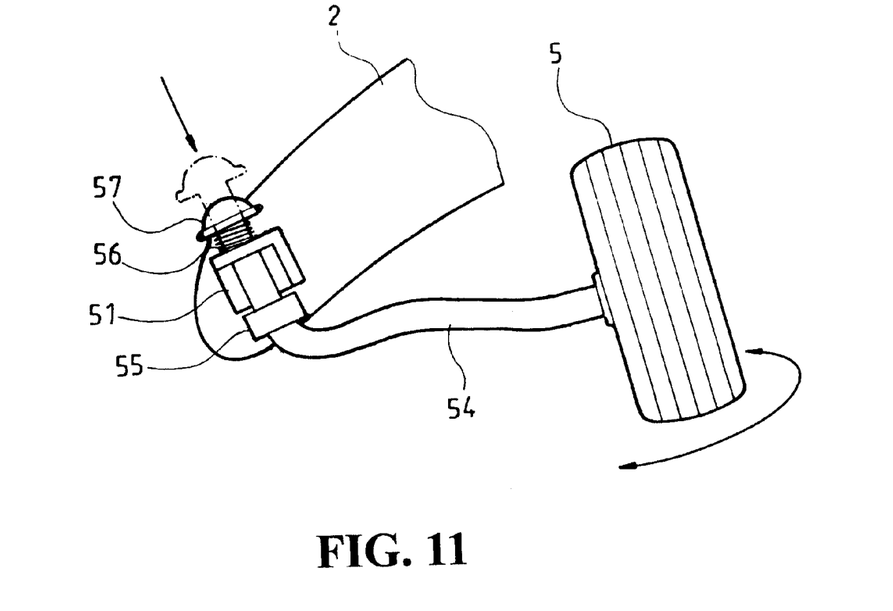
FIG. 11 shows the folding of the auxiliary wheel in accordance with the present invention.

Referring to FIGS. 5, 6, and 7, the cylindrical seat 16 is provided with a rotating shaft 161 and a horizontal shaft 162 is extended from the rotating shaft 161 for the connection of the cable 163. The control shaft 4 is provided with a transverse shaft 41 such that after the cable 163 passes through the sloping shaft 17, the securing shaft 18 and the support frame 19, it is connected to the transverse shaft 41 so as to control the left and right movement of the control shaft 4. By means of the actuation of the cable 163 to control the moving direction of the front wheel 11, and in order to smoothly transmit the cable 163, the cable 163 is mounted with a mounting tube 164 and the two ends of the cables 163 are provided with a blocking plate 165 so that the cable 163 is smoothly actuated Referring to FIGS. 8 to 11, the auxiliary wheel 5 is provided with a square seat 51 and the sides and top section of the seat 51 are respectively provided with mounting holes 52, 53 such that the mounting hole 52 is locked to the center axis 201 of the rear wheel. The wheel shaft 54 of the auxiliary wheels 5 is provided with a securing block 55 and after the wheel shaft 54 passes through the mounting hole 53 at the upper section of the seat 51 a spring 56 is mounted and a press button 57 is locked. In operation, the press button 57 is pressed and the securing block 55 is dislocated from the seat 51 and the auxiliary wheels 5 are extended or folded and during releasing of the auxiliary wheels 5 the securing block 55 is positioned at the seat 51.

Figure 12:
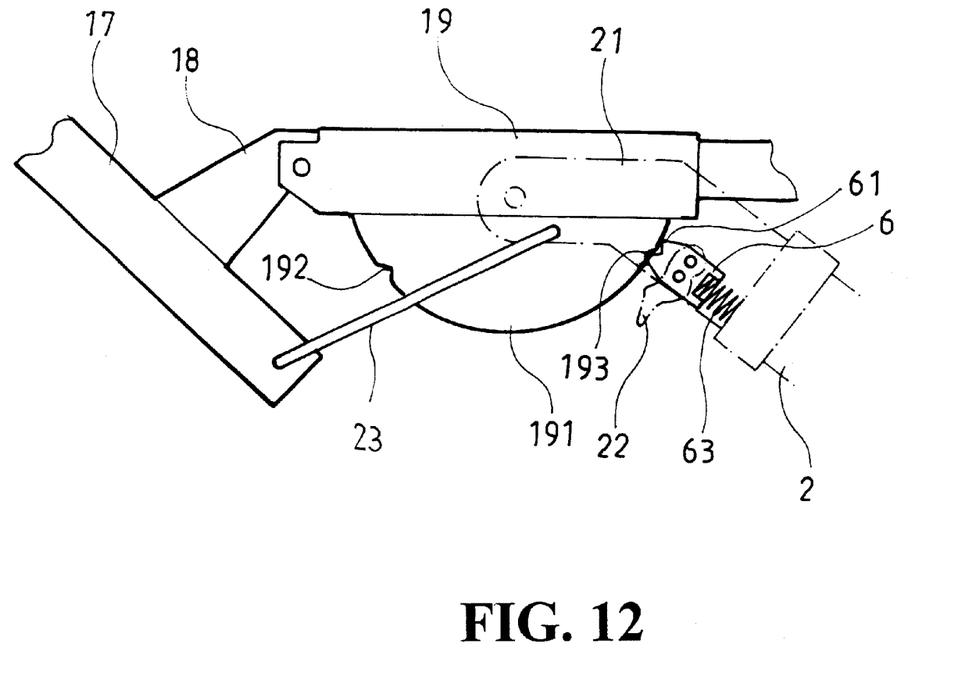
FIGS. 12–14 schematically show the folding of the bicycle structure in accordance with the present invention.
Figure 13:
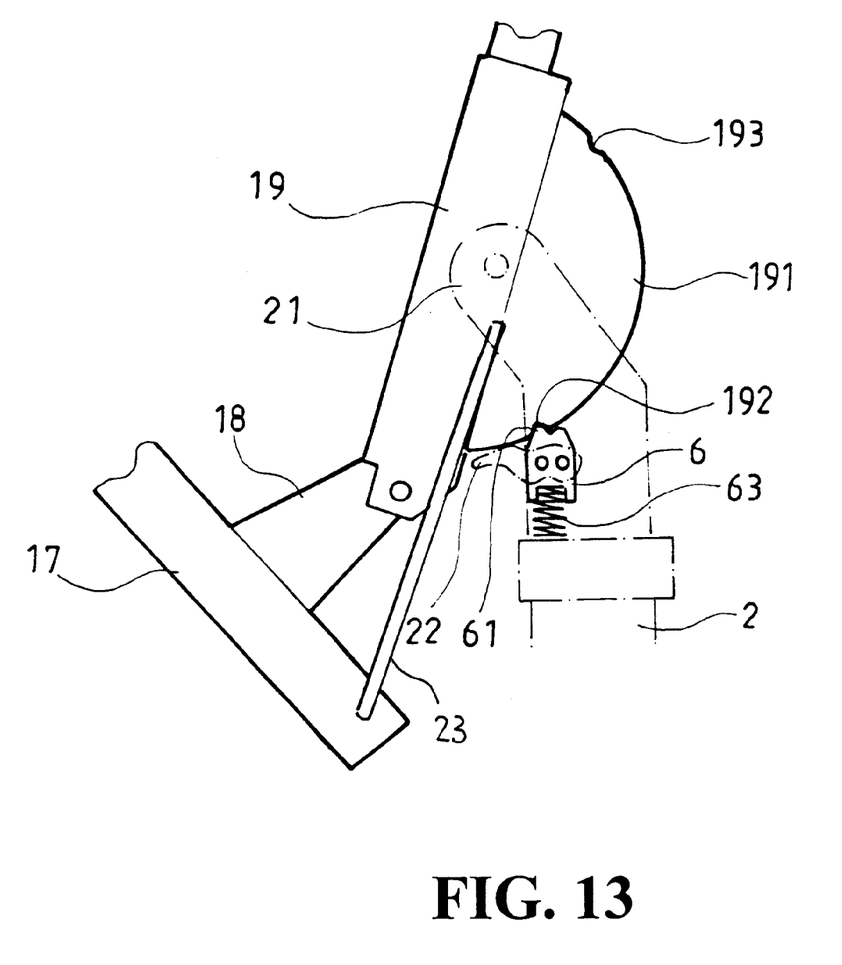
Figure 14:
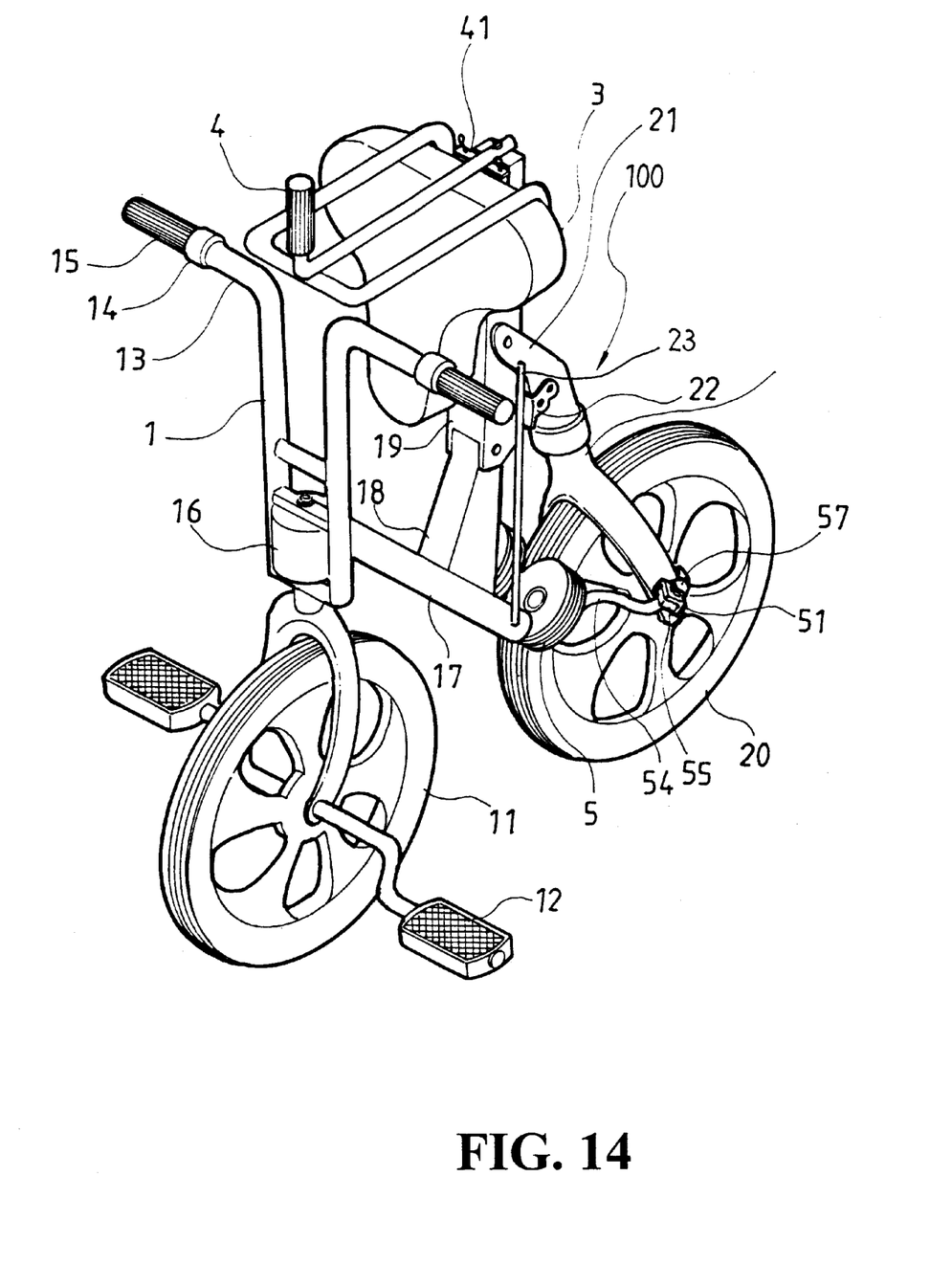

Referring to FIGS. 12, 13, and 14, during folding, the control button 22 is triggered and the connection seat 21 is folded downward, and the engaging button 6 can be exactly engaged at the notch 192 of the semi-circular plate body 191, and the support frame 19 is extended upward such that the entire bicycle structure 100 is extended upward and the front and rear frame 1,2 are folded which facilitates shipping and storage.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An improved structure of a bicycle for children comprising a front frame having a pair of handles extended from an upper section thereof and an end face of each handle being provided with protruded securing plate and a center of the front frame being provided with a cylindrical seat which is connected to a sloping shaft mounted with a securing shaft;

a pair of grips having a sectional end face being provided with lugs corresponding to the securing plate of the handles so as to pivotally mount the grips to the securing plate, and the grips being foldable;

a rotating shaft mounted to the cylindrical seat of the front frame having a horizontal shaft for the connection of two cables;

a support frame connected to the securing shaft of the front frame and having a control shaft positioned at a rear edge of the support frame and the control shaft being provided with a transverse shaft such that the cables of the rotating shaft are connected to the transverse shaft, and the bottom of the support frame being provided with a semicircular plate body having two notches;

a rear frame having a front end mounted with a connection seat having a securing hole and a long hole, wherein the front end is provided with protrusion and a rear is provided with engaging button with mounting recess mounted on the connection seat after a spring is mounted thereto and a U-shaped control button is disposed at the connection seat such that the engaging button and the control button are respectively secured at the interior and exterior of the connection seat;

two auxiliary wheels being mounted at the rear fie having a square shaped seat and a lateral side and an upper side of the square shaped seat being provided with a mounting hole such that the mounting hole is locked at the center axis of the rear wheel, and the wheel shaft of the auxiliary wheel being provided with a securing block such that after a wheel shaft is mounted from an upper mounting hole a spring is then locked to a press button; thereby the control shaft can control the moving direction of the bicycle by means of the cables, the frame of the bicycle can be folded;

wherein the handles and the end faces of the grips are provided with threads such that the handles and the grips can be locked with a mounting ring, facilitating manual operation of the bicycle, and the cables connected to the rotating shaft and the control shaft are mounted with a mounting tube and the two ends of the cable are respectively provided with a blocking plate, facilitating smooth movement of the cable.

* * * * *